US005587900A

United States Patent [19]
Bullen

[11] Patent Number: 5,587,900
[45] Date of Patent: Dec. 24, 1996

[54] SELF LEVELING INDEPENDENTLY PROGRAMMABLE SYSTEM

[75] Inventor: George N. Bullen, Oxnard, Calif.

[73] Assignee: Northrop Grumman Corporation, Los Angeles, Calif.

[21] Appl. No.: 447,707

[22] Filed: May 23, 1995

[51] Int. Cl.$^6$ .................................................. G06F 19/00
[52] U.S. Cl. ........................ 364/167.01; 364/468.21; 248/550
[58] Field of Search ........................ 364/138–142, 364/167.01, 178, 468.01, 468.21, 474.01, 474.17, 474.34, 474.37, 559; 33/366, 568, 569; 108/136, 144; 248/550, 638, 542, 649–651; 269/19, 55, 56, 58, 20, 21

[56] References Cited

U.S. PATENT DOCUMENTS

| | | |
|---|---|---|
| 2,507,900 | 5/1950 | Goetsch . |
| 2,661,653 | 12/1953 | Castiglia . |
| 3,331,575 | 7/1967 | Anderson . |
| 3,464,654 | 9/1969 | Kolesar ............................. 248/650 |
| 3,559,980 | 2/1971 | Asiya-Shi et al. ................ 269/20 |
| 4,182,506 | 1/1980 | Boveia ............................... 248/651 |
| 4,477,045 | 10/1984 | Karasawa et al. ................ 248/550 |
| 4,527,783 | 7/1985 | Collora et al. .................... 269/21 |
| 4,930,741 | 6/1990 | Young ................................ 248/542 |
| 4,949,467 | 8/1990 | Oman ................................ 33/366 |
| 4,956,764 | 9/1990 | Carver et al. .................... 364/167.01 |
| 5,020,357 | 6/1991 | Kovacevic ........................ 248/542 |
| 5,180,127 | 1/1993 | Klose ................................ 248/550 |
| 5,212,647 | 5/1993 | Raney ............................... 364/474.34 |

Primary Examiner—Tan V. Mai
Assistant Examiner—Steven R. Garland
Attorney, Agent, or Firm—Terry J. Anderson; Karl J. Hoch, Jr.

[57] ABSTRACT

The present invention is embodied in a self leveling system for sensing and changing the inclination of generally horizontal members of a jig frame assembly that includes a manufacturing plane, which system includes a lifting means affixed generally under an end of one of the horizontal members, a level sensing means affixed to the member for sensing an inclination of the member, and a computer comprising means to input a desired orientation of the manufacturing plane with respect to the horizon, means to compare the sensed inclination of the horizontal member with the desired orientation, means to compute a change in the sensed inclination to achieve the desired orientation, and means to transmit a control signal proportional to the change to the lifting means for the purpose of achieving the desired orientation of the manufacturing plane.

11 Claims, 2 Drawing Sheets

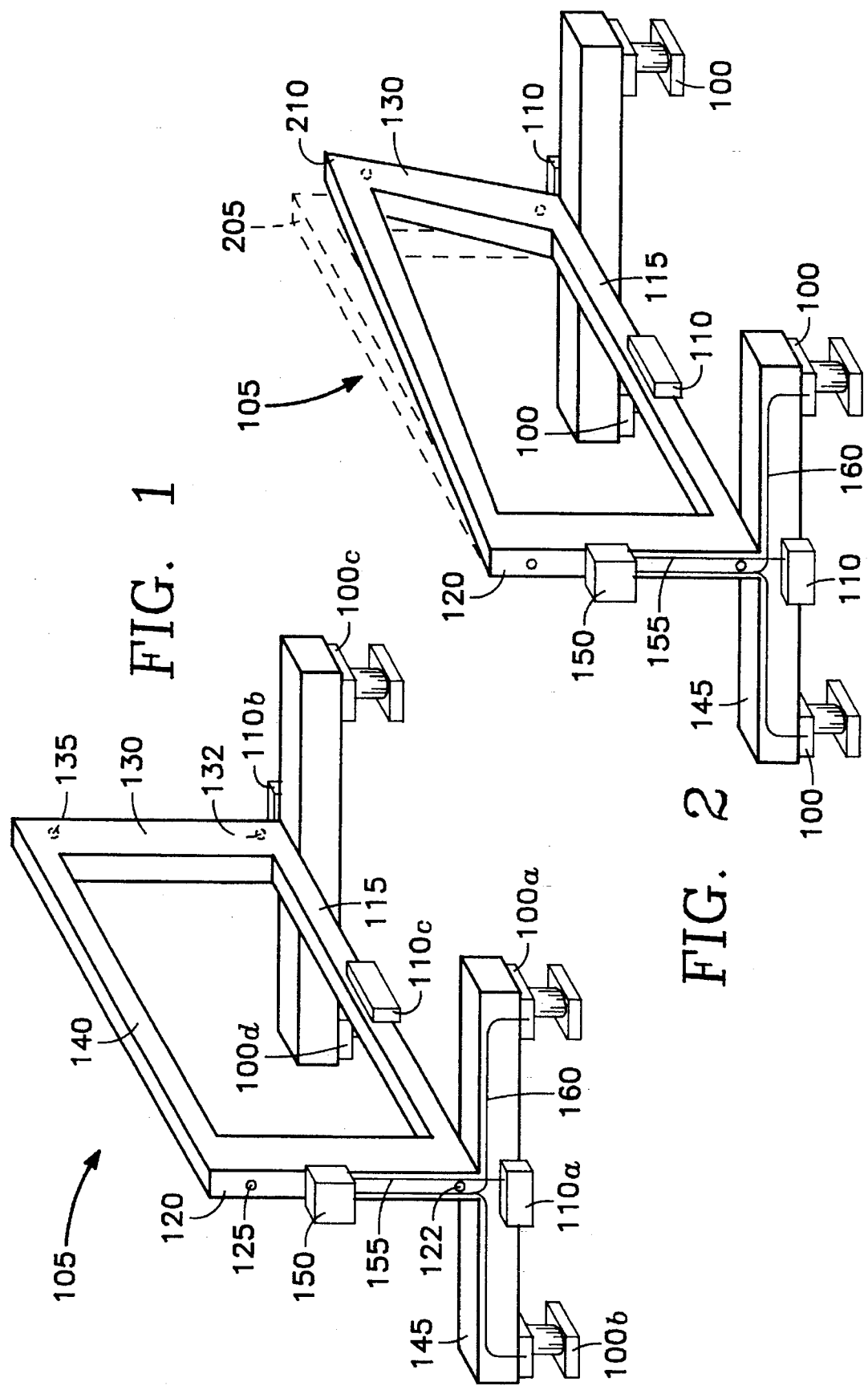

SELF LEVELING INDEPENDENTLY PROGRAMMABLE SYSTEM

BACKGROUND OF THE INVENTION

1. Technical Field

The present invention relates to a leveling system for the automatic sensing and adjusting of the inclination of equipment, such as assembly jig frames and fixtures used for the assembly and fabrication of sections of aircraft fuselage.

2. Background Art

In the aerospace industry, large airframe components are assembled by attaching individual piece parts to a structure called an assembly jig frame in a precise relationship to one another. The jig frame consists of adjustable lifting devices that may be connected by generally horizontal members, which support manufacturing planes. The manufacturing planes are generally positioned in a vertical relation to the horizon, but may be positioned in other suitable orientations for specific assembly operations. The piece parts or work pieces are held in place by tools that are, in turn, secured to the manufacturing planes. After the piece parts are fastened in the assembly jig frame, assembly operations are performed on the parts such as drilling and riveting or bonding.

The tools must be precisely located and attached to the assembly jig frame in order to assure the proper relationship between piece parts for the assembly operations. Precise location of the tools is also important because their relationship may have to be changed during assembly operations. For example, it is often necessary to remove one set of tools and install another set to complete an assembly operation, to assemble another section of the airframe component, or to perform a different operation on the same component.

Typically, precision optical measuring instruments identify the proper location for the tool details, and locate the tool details, on the assembly jig frame. Such precision instruments use their relationship with the horizon as the foundation for accurate measurements. Each such optical instrument used in the construction, attachment, and maintenance of the tool details located on the assembly jig frame is leveled, or made parallel to, the horizon before it is used. All location calculations are based on this datum plane. For this reason, the horizon is the most closely monitored and maintained datum plane in the manufacture and cycle calibration of the tool details located on, and attached to, the assembly jig frame.

Since these optical instruments use the horizon as the datum plane, the assembly jig frame must also use the same datum plane in order to establish and maintain a common relationship between the measuring instruments and the tools that are secured to the assembly jig frame. Therefore, it is critical that the assembly jig frame can be adjusted to attain, maintain and retain a predetermined alignment with the horizon.

Previous methods and devices used to align the assembly jig frame to the horizon are manually performed and adjusted. The assembly jig frames are positioned on cement floor and brought into a level position with the horizon through the use of adjustable lifting devices, such as jacks, attached to the bottom of the assembly jig frame. The jacks press against pads which sit on the cement floor. Each assembly jig frame may have as many as 30 jacks, and each jig frame may weigh up to 250 tons.

The position of the jig frame is adjusted by a team of mechanics. The team arbitrarily selects one jack with a close proximity to the floor, e.g., two inches, and identifies it as the "master jack", or reference jack. The purpose for this selection is to minimize the upward adjustments of all jacks by identifying the jacks to be adjusted as those that require the minimum travel to achieve horizontal, starting with the reference jack.

The process begins with one mechanic turning a jack by hand using a wrench while a second mechanic holds a measuring scale positioned on a horizontal portion of the frame, directly above the jack. A third mechanic uses an optical instrument, such as a level, to measure and record the distance from the level of the instrument to the selected part of the frame, for example a level button. The first and second mechanic then move to a second jack and adjust its height until the third mechanic signals that the same height is indicated. The order in which the jacks are selected for adjustment is determined empirically for a particular type of jig frame. This method is repeated sequentially on each jack until all the horizontal members supporting the assembly jig frame are all in the same datum plane, i.e., parallel to the horizon.

The next step in initially setting up the jig frame for assembly operations is to measure the manufacturing planes of the jig to determine if the planes are in desired orientations for assembly operations. Although the jig frame may be assembled with the manufacturing planes in the desired orientation to the horizontal members, this assembly operation does not result in alignments with the degree of precision adequate for assemble operations, e.g. thousands of an inch for manufacturing planes of 25 to 50 feet in length.

To correct for this misalignment, the jacks must be adjusted to bend the jig frame very slightly in a precise manner to bring the manufacturing planes into proper alignment. For example, if a manufacturing plane is required to be vertical to the horizon, an optical instrument, such as a jig transit, is used to site selected locations on the plane, i.e., tooling pads, and determine the distances that the pads must be moved to bring the manufacturing plane into a vertical orientation to the horizon. To achieve this orientation, mechanics then adjust jacks to raise or lower portions of the jig to bend the jig frame until sequential observation of the tooling pads by the jig transit indicates that the manufacturing plane is vertical to the horizon. The jig may then be ready to start assembly operations.

Subsequent adjustments of the jig may be needed depending on the type of assembly operations to be performed. For example, one of the manufacturing planes may need to be moved to a different orientation than its original orientation in order to accomplish a selected assembly operation and then returned to its original orientation. This method could be required in order to assemble a component into a airframe that has been stressed in order to induce a residual stress in the component after the stress has been removed from the airframe. To accomplish this with current techniques, repeated observation of tooling pads and adjustment of the jacks is required , i.e. a "trial and error" method.

After initial set up, the observation and adjustment operation must be repeated approximately every six months or whenever a physical trauma has occurred that may affect the level of the assembly jig frame. Such a trauma may result from natural causes as an earthquake, aftershocks or other geologic events including tidal ebb and flow, i.e., sublimation. Adjustment is also necessary because of the additional weight of aircraft components that are added to the jig frame during aircraft construction. Each such manual adjustment cycle of the jig frame results in costly disruption of the aircraft assemble operation.

SUMMARY OF THE INVENTION

The present invention is embodied in a self leveling system for sensing and changing the inclination of generally horizontal members of a jig frame assembly that includes a manufacturing plane, which system includes a lifting means affixed generally under an end of one of the horizontal members, a level sensing means affixed to the member for sensing an inclination of the member, and a computer comprising means to input a desired orientation of the manufacturing plane with respect to the horizon, means to compare the sensed inclination of the horizontal member with the desired orientation, means to compute a change in the sensed inclination to achieve the desired orientation, and means to transmit a control signal proportional to the change to the lifting means for the purpose of achieving the desired orientation of the manufacturing plane.

BRIEF DESCRIPTION OF THE DRAWINGS

FIG. 1 is a perspective view of a system of the present invention mounted on an assembly jig frame.

FIG. 2 is a perspective view of system of FIG. 1 with a manufacturing plane shown in two orientations.

DETAILED DESCRIPTION OF THE PREFERRED EMBODIMENT

Figure 3:
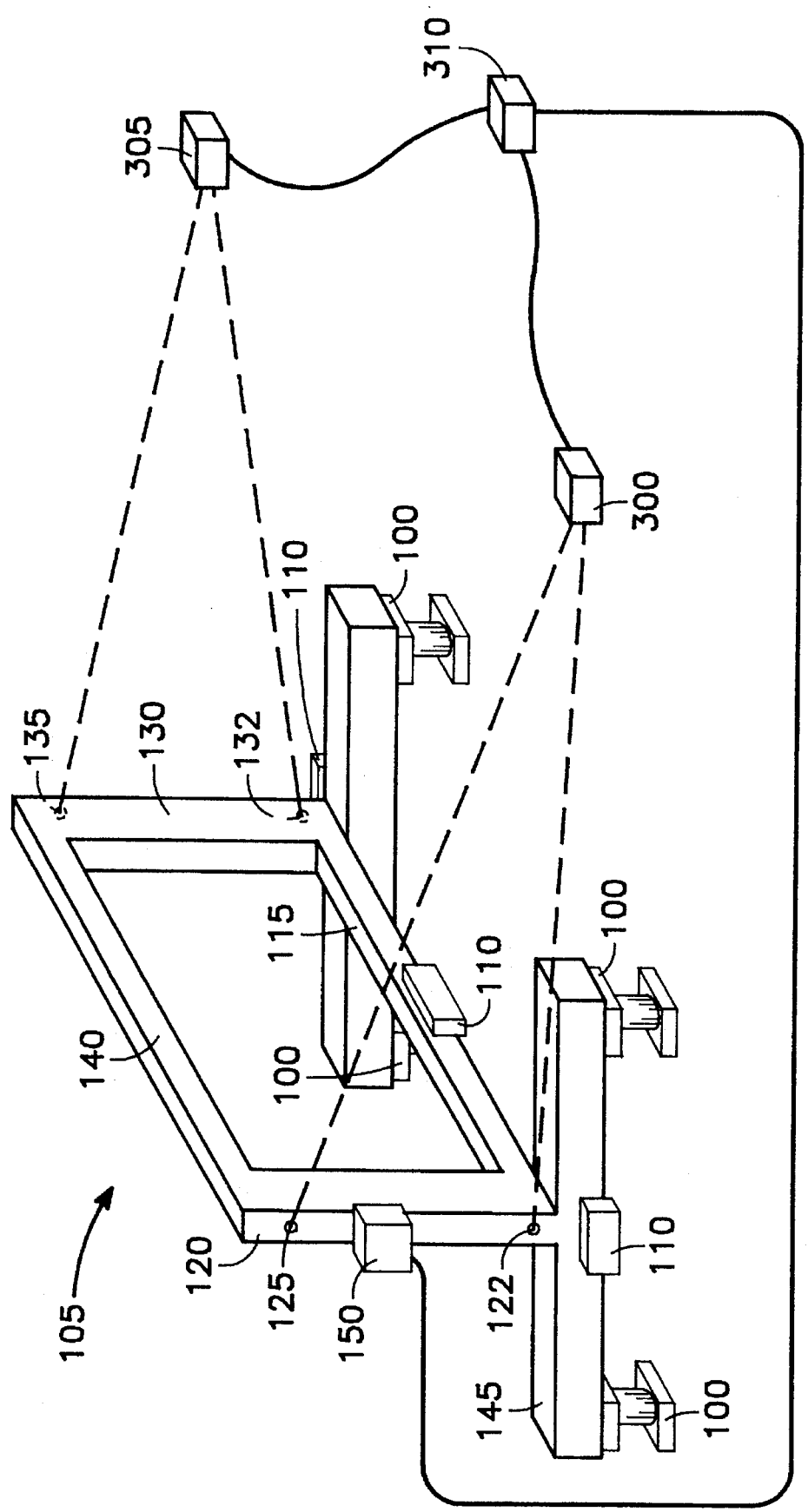
FIG. 3 is a perspective view of system of FIG. 1 shown interconnected with a conventional theodolite alignment system.

Lifting devices 100, such as electric jacks, are positioned at floor-contacting positions under the equipment to be adjusted, such as the assembly jig frame 105 in FIG. 1. Level sensors 110, such as the servo inclinometers made by Schaevitz Products of Pennsauken, N.J., are affixed to horizontal members of the jig frame 105, such as longitudinal member 115, at positions approximately midway between the ends of each member 115. Each sensor 110 is positioned such that the center line of the sensor 110 is parallel to the center line of the member 115 on which it is mounted. A manufacturing plane, of a generally vertical orientation, is defined by a first vertical member 120, a second vertical member 130, and an elevated horizontal member 140. Each vertical member defining the manufacturing plane, for example members 120 and 130, have at least two tooling pads placed at the midpoints of each of the members for alignment of the plane into the desired orientation. For example, vertical member 120 may have tooling pads 122 and 125, and vertical member 130 may have tooling pads 132 and 135.

A computer 150 is mounted on the jig frame 105 at a position and height that is convenient for observation by an operator. Sensor cables 155 and lifting device cables 160 connect the sensors 110 and lifting devices 100, respectively, to the computer 150.

An additional sensor 110 and lifting devices 100 are attached to a transverse member 145. Additional horizontal members could also be placed at angles other than orthogonal to longitudinal member 115 for additional support of the jig frame 105.

The operation of the system begins by an operator turning on the computer and entering the initial desired inclination of the jig frame 105 with respect to the horizon, i.e., parallel or horizontal for an initial setup, into the computer 150. Starting with a reference lifting device, for example 100a, the computer 150 determines whether a first sensor adjacent to the reference lifting device, for example sensor 110a, is transmitting a sensing signal that indicates a nonparallel condition of the sensor 110a with respect to the horizon. If the computer 150 receives a sensing signal, the computer 150 identifies which lifting device, for example lifting device 100a or 100b, requires the minimum adjustment to adjust the first sensor 110a to be parallel with the horizon, and transmits a control signal to the selected lifting device until the sensing signal is no longer received.

The computer 150 then samples the output signals of sensors 110 in a predetermined sequence developed empirically and transmits control signals to lifting devices 100 in order to adjust the jig frame 105 generally horizontal to the horizon. For example, for the jig frame 105 shown in FIG. 1, it has been determined that the most desirable sequence is to first sample sensor 110a and, if a nonhorizontal position is indicated, lifting device 100b is adjusted until a horizontal signal is received from sensor 110a. Sensor 110b is sampled next and, if a nonhorizontal position is indicated, lifting device 100c or 100d is adjusted until a horizontal signal is received from sensor 110b. Finally, sensor 110c is sampled and, if a nonhorizontal position is indicated, lifting devices 100c and 100d are adjusted simultaneously until a horizontal signal is received from sensor 110c.

After this initial automatic adjustment, the prior art method of observing the tooling pads with a jig transit is necessary to bring the manufacturing plane into the desired orientation. For example, a jig transit sites tooling pad 122 and tooling pad 125 to determine the distance that pad 125 must be moved for the member on which it is mounted, i.e., member 120, to be in a desired orientation, for example vertical to the horizon. The operator enters this distance into the computer 150, which transmits a control signal to the appropriate lifting devices 100 to bend the jig frame 105 in order that the member 120 is vertical to the horizon. The same process is repeated on other members that define the manufacturing plane, for example member 130.

The computer 150 stores the sensed inclinations, or output signals, from each sensor 110 after the manufacturing plane has been adjusted to the desired orientation to the horizon, for example vertical to the horizon. This set of sensed orientations to achieve a desired orientation of a manufacturing plane, which set is stored in computer 150, constitutes a record of the bend, or out-of-tolerance construction, of the particular jig frame 105. This data set may be referred to as an orientation inclination data set, e.g., the vertical inclination data set. The recognition of the significance of this data set for jig frame alignment, and its storage and use is a key element in achieving the objects of the invention.

For example, if a geophysical trauma occurs such as an earthquake, one or more of the lifting devices 100 may be raised or lowered by the event. The prior art method would require hundreds of hours of manual trial and error observations and adjustments to readjust the jig frame 105 in order that the manufacturing plane be in the desired orientation, resulting in costly delays in aircraft production. With the apparatus and method of the invention, however, the readjustments are performed automatically within a few minutes, and with minimal disruption of the assembly line. After the trauma, the computer 150 samples the output signals of sensors 110 and computes differences between the output signals and the orientation inclination data set. The computer 150 calculates control signals based on these differences and transmits these control signals in the predetermined sequence described earlier to the lifting devices 100. The lifting devices 100 raise or lower the jig frame 105 until the sensed inclinations are the same as those constituting the orientation inclination set.

An additional aspect of the invention is a delay feature that delays any adjustment of the lifting devices after a trauma for fixed time period to avoid making adjustments for transitory phenomena. For example, an item of heavy machinery moving across the assembly floor will cause one or more of the sensors 110 to transmit a signal indicating a change in inclination. Since this type of event does not cause a permanent change in inclination of the jig frame 105, it would be inappropriate for the invention to adjust the lifting devices 100. Accordingly, the computer 150 is first programmed to wait several seconds after each change in sensed inclination, for example ten seconds, to determine if the condition is a momentary trauma. If the sensed inclination does not change during this period, the computer 150 performs the adjustment process described above.

The operator may also program the computer 150 to stop sampling sensors 110 or adjusting lifting devices 100 after the desired inclination is reached, or after some approximation of the orientation inclination data set is sensed by the sensors 110. Alternately, the computer may be programmed to continuously operate by sampling sensors 110 and adjusting lifting devices 100.

In another aspect of the invention, the jig frame 105 may be adjusted to move the manufacturing plane to an orientation different from the original, i.e., a second desired orientation, to perform certain assembly operations and readjusted to the original desired orientation quickly and easily. For example, in FIG. 2, the manufacturing plane has been moved from an original orientation 205 to a second desired orientation 210 to assemble certain components while the previously assembled components are under stress. Conventional optical instruments and methods are used in conjunction with the invention to adjust the lifting devices 100 in order to achieve the second desired orientation 210. The computer 150 records an orientation inclination data set for the second orientation 210. In this configuration, the invention is able to correct for physical trauma and other objects of the invention. After the assembly operation (e.g. under stress) is completed, the original orientation 205 can easily be reestablished by directing the computer 150 to transmit control signals to the lifting devices 100 necessary to return the jig frame 105 to the original orientation 205.

The jig frame 105 may also be moved up and down to adjust the "work envelope" for the assembly line workers while the desired orientation of the manufacturing plane is maintained. In any particular position, the assembly worker can only safely access work pieces (such as aircraft assembly components) that are located approximately two to three feet above or below a reference point such as his or her waist. This usable area is referred to as the "work envelope". Attempts to extend this work envelope either result in unsafe work conditions or costly readjustment of either the jig frame or scaffolding. The invention extends the work envelope by enabling the jig frame 105 to be elevated or lowered without losing the alignment of the manufacturing plane to the horizon. The computer 150 may be programmed to transmit control signals to the lifting devices 100 to raise the jig frame 105 without changing the orientation inclination data set, i.e., a parallel translation of the jig frame.

Finally, the invention provides for the exchange of information with other jig frame alignment systems to enhance their accuracy, through a process known as "alignment of metrics". As shown in FIG. 3, one prior art method of aligning the manufacturing plane (typically in other than a vertical orientation) is the use of theodolites 300 and 305. Theodolites are optical instruments capable of precise measurement of distance and angles using the horizon as a reference. By using theodolite 300 to site to pads 122 and 125, and theodolite 305 to site to pads 132 and 135, the precise orientation of manufacturing plane can be measured with respect to the horizon. Prior alignment methods consisted of manual adjustments of lifting devices 100 based on the theodolite measurements. Theodolite measurements can be combined in a computer 310 for ease of display and to compute tolerance limits.

By combining the measurements of computer 150 and the theodolite measurements, the accuracy of the theodolite measurements can be improved. For example, the theodolite distance measurements may have a tolerance of ±0.003 inches. After a trauma to the jig frame 105, a movement of lifting devices 100 may have occurred, but if the resulting movement of the manufacturing plane is within the tolerance limits of the theodolites (for example +0.002 inch), the theodolite measurements may indicate no movement of the plane with a tolerance of ±0.003 inch, which could mean that the plane actually moved 0.005 inch. However, measurements of changes in inclination by the sensors 110 are able to detect resulting changes in the manufacturing plane location with a much higher degree of accuracy, for example ±0.001 inch. By transmitting the output of computer 150 to computer 310, the reference point for the theodolite measuring system can be reset by the actual movement of the manufacturing plane, e.g., 0.002 inches in this case. This resetting of the reference point by the is referred to as "alignment of the metrics".

Although the present invention has been described with reference to preferred embodiments, workers skilled in the art will recognize that changes may be made in form and detail without departing from the spirit and scope of the invention.

What is claimed:

1. A system for sensing and changing an inclination of generally horizontal members of a jig frame assembly that includes a manufacturing plane, comprising a lifting means affixed generally under an end of one of said members;

a level sensing means affixed to said member for sensing an inclination of said member; and a computer comprising means to input a desired orientation of said manufacturing plane with respect to the horizon, means to compare said sensed inclination of said horizontal member with said desired orientation, means to compute a change in said sensed inclination to achieve said desired orientation, and means to transmit a control signal proportional to said change to said lifting means for the purpose of achieving said desired orientation of said manufacturing plane.

2. The system of claim 1 further comprising a second lifting means affixed generally under an end opposite said end of one of said members.

3. The system of claim 1 further comprising a second level sensing means affixed on a second one of said generally horizontal members that contacts a portion of said first one of said members.

4. The system of claim 1 wherein said computer further comprises a look-up memory for storing, for each jig frame, a desired orientation of said manufacturing plane and a set of corresponding inclinations of said horizontal members sensed whenever said manufacturing plane is in said desired orientation.

5. The system of claim 4 wherein said computer further comprises means to sample said sensed inclinations of said horizontal member, means to compare said sensed inclinations to said desired orientation in said look-up memory, means to compute changes in said sensed inclinations to achieve said desired orientation, and means to transmit a control signal proportional to said changes to said lifting means for the purpose of achieving said desired orientation of said manufacturing plane.

6. The system of claim 1 wherein said computer further comprises means to delay the transmission of said control signal for a predetermined time for the purpose of avoiding changes to an orientation of said manufacturing plane caused by transitory physical trauma to said jig frame.

7. The system of claim 1 wherein said computer further comprises means to compute a translating control signal for the purpose of achieving a translation of said manufacturing plane in a desired direction relative to the horizon without changing said desired orientation.

8. The system of claim 1 wherein said computer further comprises means to transmit said sensed inclinations to other systems for sensing an orientation of said manufacturing plane.

9. A method for sensing and changing an inclination of generally horizontal members of a jig frame assembly that includes a manufacturing plane, lifting means affixed generally under an end of one of said members, and level sensing means affixed to said member for sensing an inclination of said member, said method comprising the steps of inputting with processing means a desired orientation of said manufacturing plane with respect to the horizon;

comparing with said processing means said sensed inclination of said horizontal member with said desired orientation;

computing with said processing means a change in said sensed inclination to achieve said desired orientation; and transmitting from said processing means to said lifting means a control signal proportional to said change for the purpose of achieving said desired orientation of said manufacturing plane.

10. The method of claim 9 further comprising the step of storing, for each jig frame, in a look-up memory a desired orientation of said manufacturing plane and a set of corresponding inclinations of said horizontal members sensed whenever said manufacturing plane is in said desired orientation.

11. The method of claim 10 further comprising the steps of sampling with said processing means said sensed inclinations of said horizontal member;

comparing with said processing means said sensed inclinations to said desired orientation in said look-up memory;

computing with said processing means changes in said sensed inclinations to achieve said desired orientation; and transmitting with said processing means a control signal proportional to said changes to said lifting means for the purpose of achieving said desired orientation of said manufacturing plane.

* * * * *